United States Patent
Rao et al.

(10) Patent No.: US 10,060,164 B2
(45) Date of Patent: Aug. 28, 2018

(54) WIRELESS-BASED SYSTEM AND METHOD FOR OPENING A HOOD OF A MOTOR VEHICLE

(71) Applicant: FORD GLOBAL TECHNOLOGIES, LLC, Dearborn, MI (US)

(72) Inventors: Manoharprasad K. Rao, Novi, MI (US); Mark A. Cuddihy, New Boston, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/052,507

(22) Filed: Feb. 24, 2016

(65) Prior Publication Data

US 2017/0241169 A1 Aug. 24, 2017

(51) Int. Cl.
| | |
|---|---|
| E05B 81/56 | (2014.01) |
| G07C 9/00 | (2006.01) |
| E05B 83/18 | (2014.01) |
| E05B 83/24 | (2014.01) |
| B62D 25/12 | (2006.01) |
| E05B 81/72 | (2014.01) |

(52) U.S. Cl.
CPC .............. *E05B 81/56* (2013.01); *B62D 25/12* (2013.01); *E05B 81/72* (2013.01); *E05B 83/18* (2013.01); *E05B 83/24* (2013.01); *G07C 9/00007* (2013.01); *G07C 9/00896* (2013.01)

(58) Field of Classification Search
CPC .......... E05B 81/56; E05B 83/18; E05B 83/24; E05B 81/72; G07C 9/00007; G07C 9/00896; B62D 25/12
See application file for complete search history.

(56) References Cited

U.S. PATENT DOCUMENTS

| | | | |
|---|---|---|---|
| 8,935,053 B2 | 1/2015 | Wheeler et al. | |
| 8,955,890 B2 | 2/2015 | Meidinger et al. | |
| 2005/0190041 A1* | 9/2005 | Sahai | B60R 25/1003 340/5.72 |
| 2009/0267734 A1 | 10/2009 | Kwon | |
| 2013/0049403 A1* | 2/2013 | Fannon | E05B 83/24 296/193.11 |
| 2013/0219974 A1* | 8/2013 | Lange | E05B 81/14 70/91 |
| 2014/0088826 A1* | 3/2014 | Wheeler | E05B 77/54 701/36 |

(Continued)

FOREIGN PATENT DOCUMENTS

| | | |
|---|---|---|
| GB | 2523648 A | 9/2015 |
| JP | 2008050845 A | 3/2008 |

OTHER PUBLICATIONS

English Machine Translation of JP2008050845A.

*Primary Examiner* — Jeffrey C Boomer
(74) *Attorney, Agent, or Firm* — Jason Rogers; King & Schickli, PLLC

(57) ABSTRACT

A wireless-based system is provided for opening the hood of a motor vehicle. That wireless-based system includes a wireless latch release actuator. Further, the wireless-based system also includes a controller. The controller is configured to release a secondary hood latch when (a) the wireless latch release actuator is activated, (b) a primary hood latch has already been released and (c) a motor vehicle wheel is stationary whereby the hood may be opened. A related hood opening method is also disclosed.

14 Claims, 5 Drawing Sheets

(56) References Cited

U.S. PATENT DOCUMENTS

| | | | | |
|---|---|---|---|---|
| 2015/0052958 A1* | 2/2015 | Pericak | ............... | E05B 47/0001 |
| | | | | 70/258 |
| 2015/0115617 A1* | 4/2015 | Powell | .................... | E05B 81/14 |
| | | | | 292/117 |
| 2015/0191943 A1* | 7/2015 | Tieman | ................... | E05B 81/00 |
| | | | | 292/195 |

* cited by examiner

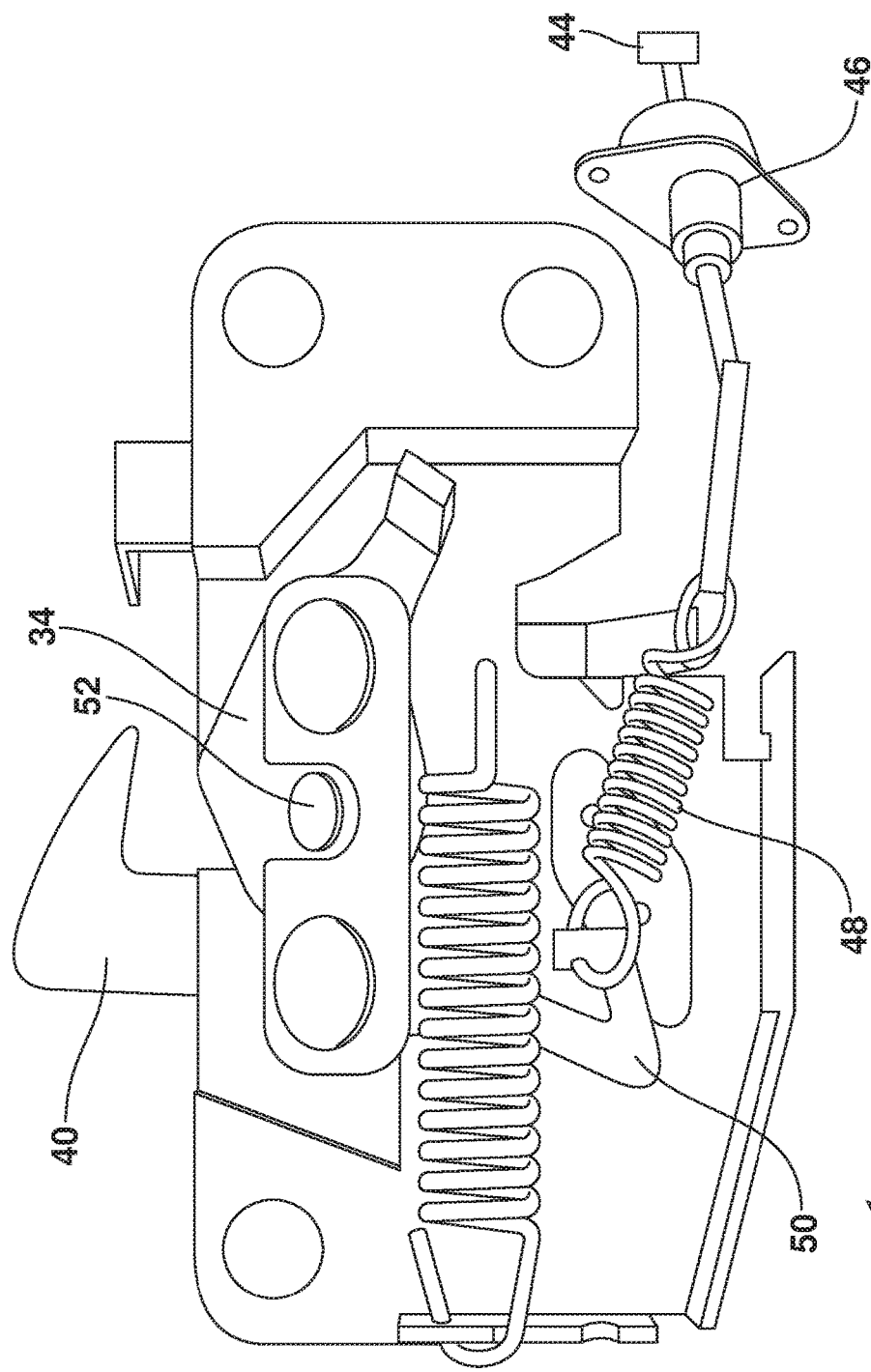

WIRELESS-BASED SYSTEM AND METHOD FOR OPENING A HOOD OF A MOTOR VEHICLE

TECHNICAL FIELD

This document relates generally to the motor vehicle equipment field and, more particularly, to a wireless-based system and related method for opening a hood of a motor vehicle.

BACKGROUND

One must often open the hood of a motor vehicle in order to perform periodic service and maintenance such as checking and topping off fluid levels. In winter months, one needs to top off the windshield washer fluid every few weeks. On cold and snow days, motor vehicle operators would like to be able to open the hood quickly to perform needed maintenance or repairs.

While the primary hood release is often conveniently located within the motor vehicle, the secondary hood release is often difficult to locate. In many vehicles, the secondary hood release lever is partially if not fully, concealed by the hood or another component of the motor vehicle body. At night or in low ambient light conditions, the location of the lever is even more difficult than usual to identify.

This document relates to a new and improved wireless-based system and related method for opening a hood of a motor vehicle by means of wireless communication. This makes opening the hood of the motor vehicle easy and convenient, thereby greatly enhancing the satisfaction of the vehicle operator.

SUMMARY

In accordance with the purposes and benefits described herein, a wireless-based system is provided for opening a hood of a motor vehicle. That wireless-based system comprises a wireless actuator, such as a key fob or smart phone including a latch release actuator, and a controller configured to release a secondary hood latch when (a) the wireless latch release actuator is activated, (b) a primary hood latch has already been released and (c) a motor vehicle wheel is stationary whereby the hood may be opened.

The controller may be configured to include a first data input to receive data respecting the lock status of the primary hood latch. Further, the controller may be configured to include a second data input to receive data respecting the rotation status of a motor vehicle wheel.

The controller may be further configured to release a motor vehicle storage compartment latch when (a) the latch release actuator is activated and (b) the primary hood latch remains latched. That storage compartment latch may be a trunk latch. In another possible embodiment, that storage compartment latch may be a tailgate latch. In yet another possible embodiment, the storage latch may be a liftgate latch.

In accordance with an additional aspect, a method is provided of unlatching and opening a hood of a motor vehicle via a wireless actuator. That method comprises the steps of activating a wireless latch release actuator and unlatching, by controller, a secondary hood latch only if a primary hood latch has already been released and a motor vehicle wheel is stationary.

The method may further include the step of monitoring, by a first sensor, the lock status of the primary hood latch. Further, the method may include monitoring, by a second sensor, the rotation status of the motor vehicle wheel.

Further, the method may include the step of unlatching, by the controller, a motor vehicle storage compartment latch when the latch release actuator is activated and the primary hood latch remains latched. In this way a single wireless actuator on, for example, a key fob or a smart phone may be used to open either the storage compartment or the hood as desired by the user.

In the following description, there are shown and described several preferred embodiments of the wireless-based system and related method for opening a hood of a motor vehicle. As it should be realized, the wireless-based system and related method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the wireless-based system and method and together with the description serve to explain certain principles thereof. In the drawing figures.

FIGS. 3$a$-3$c$ are schematic illustrations illustrating the operation of a primary hood latch and secondary hood latch as the hood is opened.

Reference will now be made in detail to the present preferred embodiments of the wireless-based system for opening the hood of a motor vehicle, examples of which are illustrated in the accompanying drawing figures.

DETAILED DESCRIPTION

Figure 1:
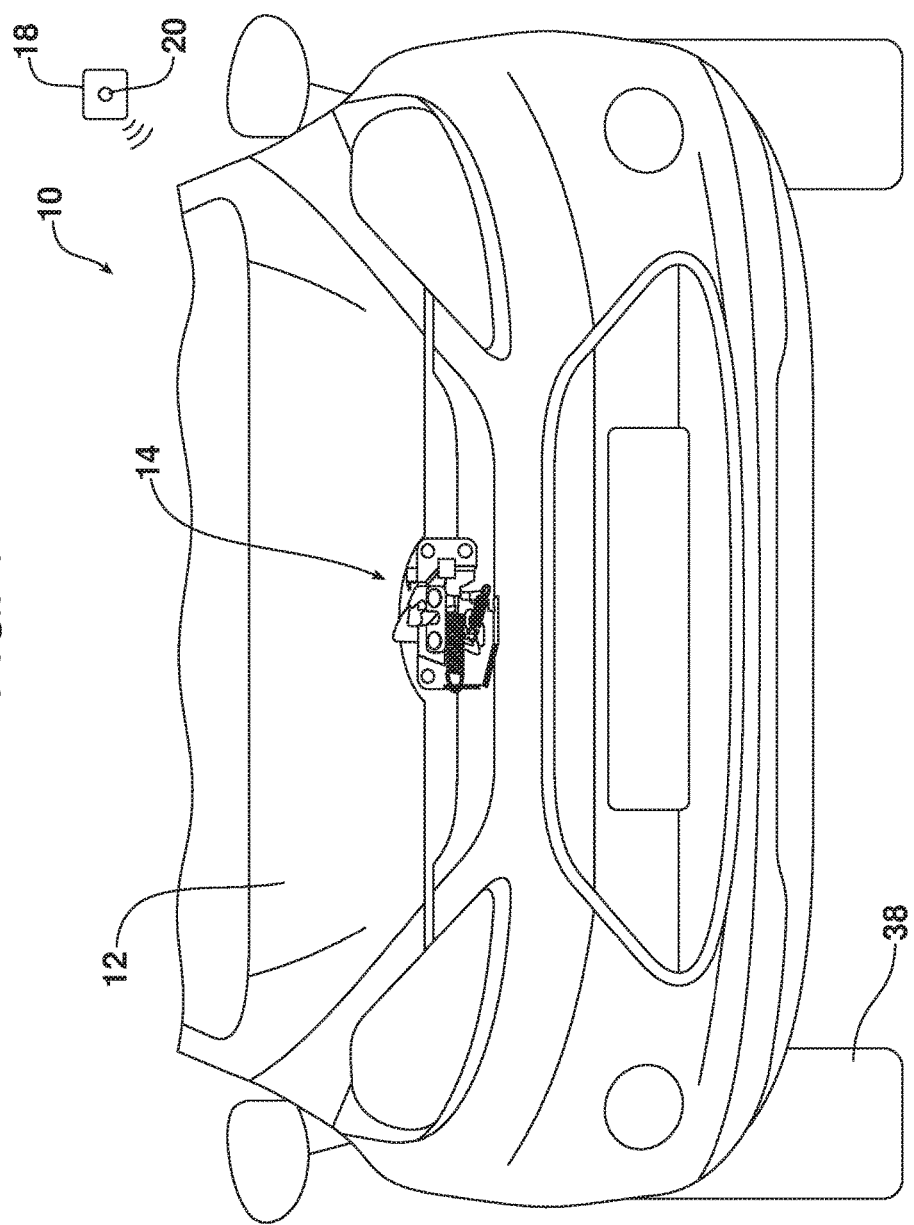
FIG. 1 is a partially broken away front elevational view of a motor vehicle equipped with the wireless-based system for opening the hood of the motor vehicle.
Figure 2:
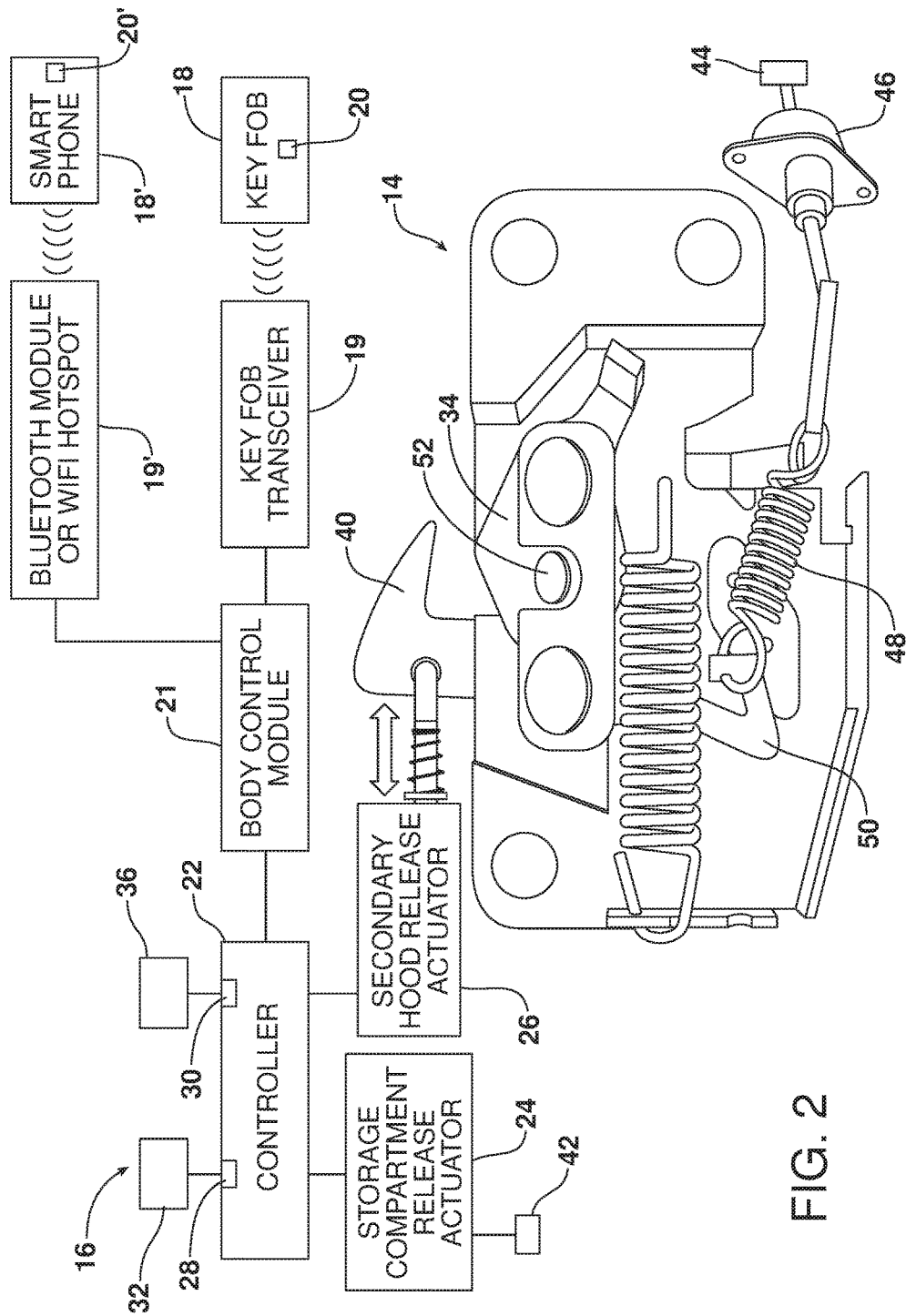
FIG. 2 is a schematic block diagram of the wireless-based system for opening the hood of the motor vehicle.

Reference is now made to FIG. 1 illustrating a motor vehicle 10 including a hood 12 that is held in a closed position by a primary and secondary hood latch mechanism generally designated by reference numeral 14. That motor vehicle 10 is equipped with the wireless-based system 16 for opening the hood 12 as schematically illustrated in FIG. 2. The system 16 includes a key fob 18, a smart phone 18', operating in accordance with a motor vehicle communication app, or other like device that is matched by electronic code or other means to the motor vehicle 10. As is known in the art, the key fob 18 communicates wirelessly with a key fob transceiver 19 that is connected to a body control module 21 of the motor vehicle. In contrast, the smart phone 18' communicates wirelessly with a Bluetooth module or wifi hotspot 19' that is connected to the body control module 21 of the motor vehicle 10. The body control module or BCM 21 performs a number of interior body electrically based functions including, for example, interior locking, remote key entry, interior light, exterior light, windshield wiper control and the like. In some embodiments the BCM 21 may also function to control entertainment functions (e.g. radio, CD player and communications such as telephone and Internet communications over a wireless network). In some embodiments the BCM 21 is connected by a communication bus (not shown) to other control modules that provide one or more of these additional functions.

As illustrated, the key fob 18 includes a wireless latch release actuator 20. In the illustrated embodiment that latch release actuator 20 takes the form of a push button. The key fob 18 may also include other control buttons. As these are not relevant to this disclosure they are not shown or described for simplicity of description. The smart phone 18' includes a wireless latch release actuator 20' which appears on a touchscreen of the device.

The wireless-based system 16 also includes a controller 22. The controller 22 is a computing device such as a dedicated microprocessor or electronic control unit (ECU) operating in accordance with instructions received from appropriate control software. Such a controller 22 may comprise one or more processors, one or memories and one or more network interfaces that communicate with each other over a communication bus.

As illustrated, the controller 22 is connected to a storage compartment release actuator 24 and a secondary hood release actuator 26. Further, the controller 22 is configured to include a first data input 28 and a second data input 30. The first data input 28 is connected to a sensor, such as a hood ajar sensor or another electronic control device or module 32 that provides data to the controller 22 respecting the lock status of the primary hood latch 34. In contrast, the second data input 30 is connected to a second sensor or electronic control device 36 that provides data to the controller respecting the rotation status of at least one wheel 38 of the motor vehicle 10. This second sensor or electronic control device 36 gives a signal indicating to the controller 22 when the motor vehicle is stationary and it is safe to open the hood 12.

As should be appreciated from the following description, the controller 22 is configured to release the secondary hood latch 40 when (a) the latch release actuator 20, 20' is activated or depressed, (b) the primary hood latch 34 has already been released and (c) the motor vehicle wheel 38 is stationary so as to thereby allow the opening of the hood 12. Further, in some embodiments, the controller 22 is further configured to release the motor vehicle storage compartment latch 42 when (a) the latch release actuator 20, 20' is activated and (b) the primary hood latch 34 remains latched. Thus, in such an embodiment, the latch release actuator 20, 20' may be depressed by the motor vehicle operator in order to release the secondary hood latch 48 and open the hood 12 or release the storage compartment latch 42 and open the storage compartment depending upon the desires of the operator. Thus, the latch release actuator 20, 20' on the key fob 18/smart phone 18' provides a dual function making it easy to open the storage compartment or the hood 12 as desired. As should be appreciated, the storage compartment latch 42 may be a trunk latch, a tailgate latch, a liftgate latch or any other storage compartment closure depending on the design of the particular motor vehicle and the architecture and programming of the system 16.

Consistent with the above description, a method is provided for unlatching and opening a hood 12 of a motor vehicle 10 via a wireless latch release actuator 20, 20' such as may be provided on a key fob 18, a smart phone 18' or other, like device. That method may be broadly described as activating a wireless latch release actuator 20, 20' and unlatching, by controller 22, a secondary hood latch 40 only if the primary hood latch 34 has already been released and the motor vehicle wheel 38 is stationary.

The method may further include monitoring, by a first device 32, the lock status of the primary hood latch 34. Further, the method may include the step of monitoring, by a second device 36, the rotation status of the motor vehicle wheel 38.

Still further, in some embodiments, the method may include the step of unlatching, by the controller 22, a motor vehicle storage compartment latch 42 when the latch release actuator 20 is activated and the primary hood latch remains latched 34.

Figure 3B:
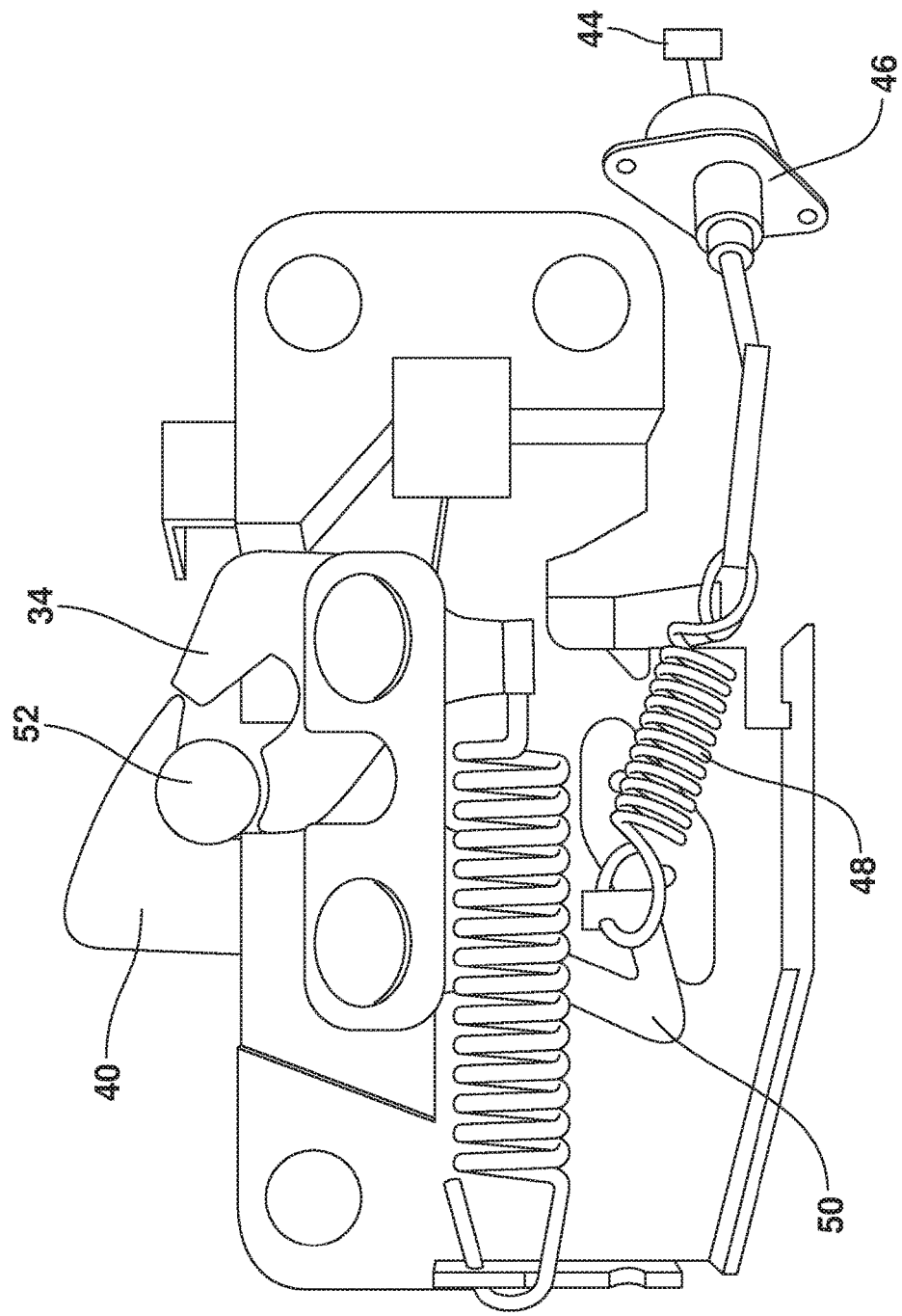
Figure 3C:
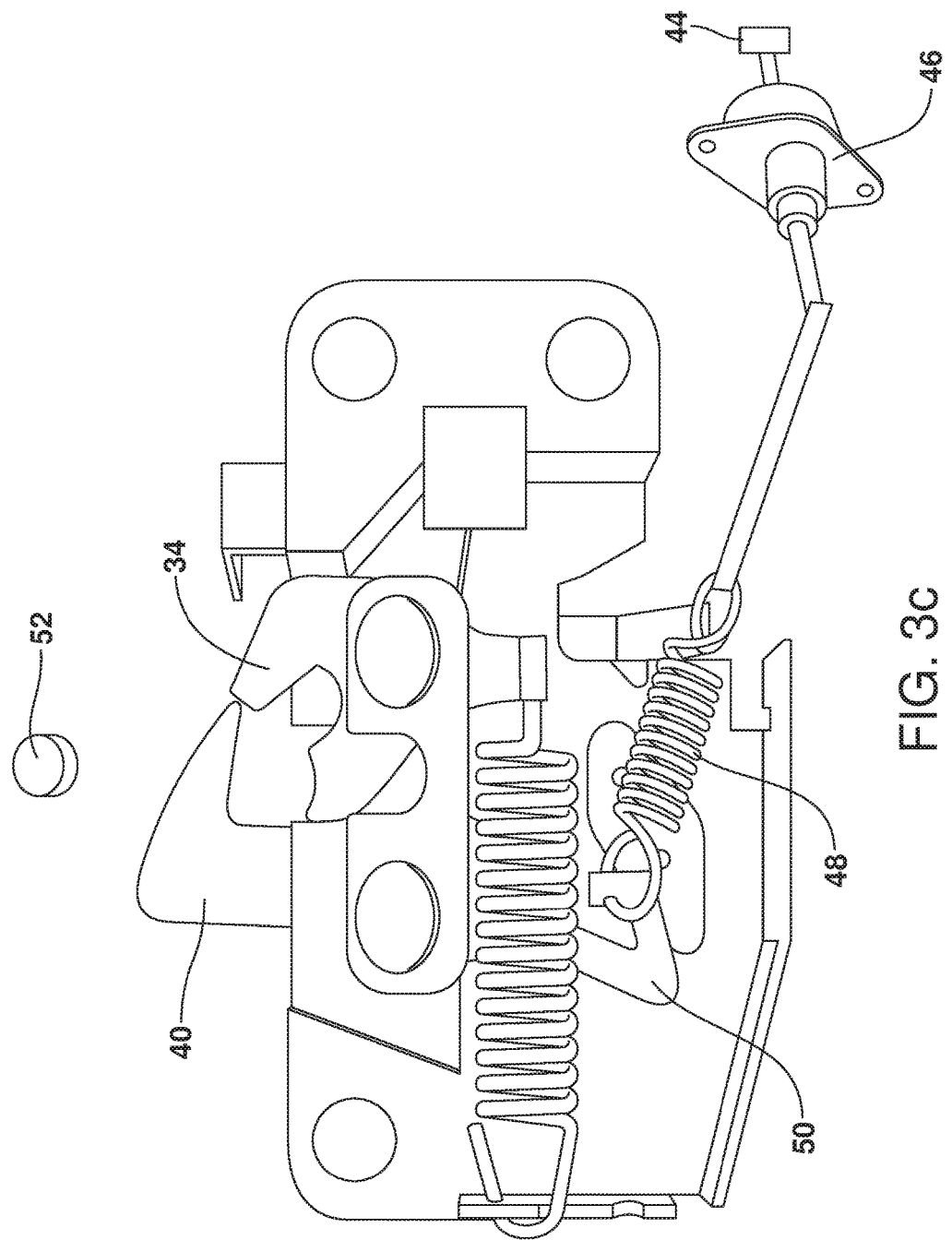

Reference is now made to FIGS. 3a and 3c illustrating the operation of the primary and secondary hood latch mechanism 14. When one wishes to open the hood 12, the operator first engages or manipulates the primary hood latch release actuator 44 which may, for example, comprise a push button or mechanical lever in the interior of the motor vehicle that is reached from the driver's seat. The actuator 44 may be connected to a linear actuator 46 that pulls the spring 48 (or pushes, depending on the latch design) attached to the primary hood latch 34 by the hood latch lever 50. As a result, the hood striker 52 is released by the primary latch 34 and is now engaged by the secondary hood latch 40. Note FIG. 3a showing the hood striker 52 engaged and locked by the primary hood latch 34 and compare to FIG. 3b showing the primary hood latch in the released position and the striker 52 now engaged by the secondary hood latch 40.

When the primary hood latch 34 has been released and the hood striker 52 of the hood 12 is engaged by the secondary hood latch 40 as illustrated in FIG. 3b, the primary hood latch device 32 provides a primary hood latch release signal at the input 28 of the controller 22. If the wireless latch release actuator 20, 20' is depressed at this time, a wireless latch release signal is sent from the key fob 18 to the key fob transceiver 19 (or from the smart phone 18' to the Bluetooth module or wifi hotspot 19') which provides that signal to the body control module 21 which, in turn, provides that signal to the controller 22. If the second sensor 36 provides a stationary wheel signal to the data input 30 of the controller 22, the controller 22 sends the necessary signal to the secondary hood release actuator 26 to release the secondary hood latch 40 thereby completely freeing the hood striker 52 from the primary and secondary hood latch mechanism 14 to allow opening of the hood 12 (see FIG. 3c). The secondary hood latch 40 is maintained in the released position for a predetermined period of time to allow the user to open the hood. After that time the secondary hood latch 40 returns to the latching position.

In contrast, if the wireless latch release actuator 20, 20' is activated when the primary hood latch 34 is closed and latching the hood striker 52 as illustrated in FIG. 3a, the controller 22 interprets the activation of the actuator 20 to call for the opening of the storage compartment and, accordingly, the controller sends a command signal to the storage compartment release actuator 24 to release the storage compartment latch 42 and allow opening of the storage compartment closure member.

The foregoing has been presented for purposes of illustration and description. It is not intended to be exhaustive or to limit the embodiments to the precise form disclosed. Obvious modifications and variations are possible in light of the above teachings. For example, instead of maintaining the secondary hood latch 40 in the hood release position for a predetermined period of time, the system 16 may include a switch/sensor, such as a plunger against the underside of the hood 12, (not shown) to sense when the hood has been opened. After hood opening, the secondary hood latch 40 is allowed to return to its hood latching position so that the hood may be properly closed and latched. All such modifications and variations are within the scope of the appended claims when interpreted in accordance with the breadth to which they are fairly, legally and equitably entitled.

What is claimed:

1. A wireless-based system for opening a hood of a motor vehicle, comprising:
   a wireless latch release actuator; and
   a controller configured to (1) release a secondary hood latch when (a) said wireless latch release actuator is activated, (b) a primary hood latch has already been released and (c) a motor vehicle wheel is stationary whereby said hood may be opened and (2) release a motor vehicle storage compartment latch when (a) said wireless latch release actuator is activated and (b) said primary hood latch remains latched.

2. The wireless-based system of claim 1, wherein said controller is configured to include a first data input to receive data respecting lock status of said primary hood latch.

3. The wireless-based system of claim 2, wherein said controller is configured to include a second data input to receive data respecting rotation status of said motor vehicle wheel.

4. The wireless-based system of claim 1, wherein said storage compartment latch is a trunk latch.

5. The wireless-based system of claim 1, wherein said storage compartment latch is a tailgate latch.

6. The wireless-based system of claim 1, wherein said storage compartment latch is a liftgate latch.

7. The wireless-based system of claim 1, further including a key fob wherein said wireless latch release actuator is provided on said key fob.

8. The wireless-based system of claim 1, further including a smart phone wherein said wireless latch release actuator is provided on said smart phone.

9. A method of unlatching and opening a hood of a motor vehicle via a wireless latch release actuator, comprising:
   activating said wireless latch release actuator;
   unlatching, by a controller, a secondary hood latch only if a primary hood latch has already been released and a motor vehicle wheel is stationary; and
   unlatching, by said controller, a motor vehicle storage compartment latch when said wireless latch release actuator is activated and said primary hood latch remains latched.

10. The method of claim 9, including monitoring, by a first device, lock status of said primary hood latch.

11. The method of claim 10, including monitoring, by a second device, rotation status of said motor vehicle wheel.

12. The method of claim 9, includes monitoring a rotation status of said motor vehicle wheel.

13. The method of claim 9, wherein activating said wireless latch release actuator includes accessing said wireless latch release actuator on a key fob.

14. The method of claim 9 wherein activating said wireless latch release actuator includes accessing said wireless latch release actuator on a smart phone.

* * * * *